US008484743B2

(12) United States Patent  (10) Patent No.: US 8,484,743 B2
Okada et al.  (45) Date of Patent: Jul. 9, 2013

(54) IMAGE FORMING APPARATUS AND COMPUTER-READABLE STORAGE MEDIUM FOR COMPUTER PROGRAM

(75) Inventors: Takuya Okada, Toyokawa (JP); Kenichi Sawada, Toyohashi (JP); Takeshi Hibino, Toyokawa (JP); Atsushi Tomita, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 379 days.

(21) Appl. No.: 12/787,897

(22) Filed: May 26, 2010

(65) Prior Publication Data

US 2010/0306843 A1  Dec. 2, 2010

(30) Foreign Application Priority Data

May 28, 2009  (JP) .................. 2009-128554

(51) Int. Cl.
G06F 21/00  (2006.01)
(52) U.S. Cl.
USPC ........... 726/26; 726/27; 726/28; 726/29; 726/30; 713/182; 713/183; 713/184; 713/185; 713/186
(58) Field of Classification Search
USPC .......................................................... 726/26
See application file for complete search history.

(56) References Cited

U.S. PATENT DOCUMENTS

| 2007/0067642 | A1* | 3/2007 | Singhal ................. 713/186 |
| 2008/0074693 | A1 | 3/2008 | Hashimoto et al. |
| 2009/0077656 | A1 | 3/2009 | Oka et al. |

FOREIGN PATENT DOCUMENTS

| JP | 63-286950 | 11/1988 |
| JP | 2003-195704 A | 7/2003 |
| JP | 2005-157716 | 6/2005 |
| JP | 2006-163954 | 6/2006 |
| JP | 2008-083809 | 4/2008 |
| JP | 2009-071834 | 4/2009 |

OTHER PUBLICATIONS

Office Action (Notification of Reason(s) for Refusal) dated Jun. 28, 2011, issued in the corresponding Japanese Patent Application No. 2009-128554, and an English Translation thereof.
Office Action (Notification of Reason(s) for Refusal) dated Feb. 22, 2011, issued in the corresponding Japanese Patent Application No. 2009-128554, and an English Translation thereof.

* cited by examiner

*Primary Examiner* — Longbit Chai
(74) *Attorney, Agent, or Firm* — Buchanan Ingersoll & Rooney PC

(57) ABSTRACT

An image forming apparatus includes a first authentication portion performing a first authentication process on a user, a second authentication portion that performs a second authentication process on the user successfully authenticated by the first authentication portion, and thereby determines whether or not the user is permitted to log onto the apparatus, and a cooperative setting portion performing setting therethrough, on a user-by-user basis, whether or not the first authentication process and the second authentication process are performed in combination with each other. If the user for whom setting is performed such that the first authentication process and the second authentication process are performed in combination with each other is successfully authenticated by the first authentication portion, then the second authentication portion determines that the user is to be permitted to log onto the apparatus based on the associated information and ends the second authentication process.

18 Claims, 15 Drawing Sheets

| USER ID | PASSWORD |
|---------|----------|
| U001 | 158#$%A# | ~DT1
| U002 | #$52#&28 | ~DT1
| U003 | 222&&&%! | ~DT1
| U004 | #5858%%? | ~DT1
| ⋮ | ⋮ |

| SECTION NUMBER | PASSWORD |
|---|---|
| 101 | S1222415 |
| 102 | A5555884 |
| 103 | AP988566 |
| 104 | BP889614 |
| ⋮ | ⋮ |

~DT2 (rows 101–104)

FIG. 6

WOULD YOU LIKE TO SET
COOPERATIVE REGISTRATION
TO BE AVAILABLE?

Yes    No

| USER ID | U001 |
| PASSWORD | ***** |

LOG-ON

GM2

| SECTION NUMBER | 101 |
| PASSWORD | ***** |

LOG-ON

GM3

WOULD YOU LIKE TO PERFORM COOPERATIVE REGISTRATION BETWEEN U001 AND SECTION 101?

Yes   No

| USER ID | SECTION NUMBER |
|---------|----------------|
| U001    | 101            |
|         | 103            |
|         | 104            |
| U002    | 101            |
| U003    | 301            |
|         | 501            |
| U004    | 103            |
|         | 204            |
|         | 208            |
|         | 401            |
| ⋮       | ⋮              |

DT3 (U001 rows)
DT3 (U002)
DT3 (U003)
DT3 (U004 rows)

| SECTION NUMBER | |
|---|---|

LOG-ON HISTORY

| 101 | 201 |
|---|---|
| 301 | 401 |
| 501 | |

| PASSWORD | |
|---|---|

LOG-ON

```
PLEASE SELECT "PERMITTED" OR "PROHIBITED"
      FOR COOPERATIVE REGISTRATION.
```

| USER ID | PERMITTED/PROHIBITED | |
|---------|-----------|------------|
| U001 | PERMITTED | PROHIBITED |
| U002 | PERMITTED | PROHIBITED |
| U003 | PERMITTED | PROHIBITED |
| U004 | PERMITTED | PROHIBITED |
| ⋮ | ⋮ | ⋮ |

OK

GM8

IMAGE FORMING APPARATUS AND COMPUTER-READABLE STORAGE MEDIUM FOR COMPUTER PROGRAM

This application is based on Japanese patent application No. 2009-128554 filed on May 28, 2009, the contents of which are hereby incorporated by reference.

BACKGROUND OF THE INVENTION

1. Field of the Invention

The present invention relates to an image forming apparatus performing an image-related process, and a computer-readable storage medium for a computer program.

2. Description of the Related Art

User authentication is widely used in many circumstances due to the recent increase in awareness of security. In an office environment, section authentication (section management) is used in combination with user authentication for the purpose of budget control for each group or each section.

In the case, however, of the combined use of the user authentication and the section authentication in an image forming apparatus, a user needs to be successfully authenticated twice until he/she is permitted to log onto the image forming apparatus, which increases the time for him/her to operate the image forming apparatus.

There is a function, for example, of incorporating, into authentication information on a user (user authentication information), information on a division to which the user belongs (section information) to perform section authentication in combination with user authentication. In order to use the function, operation for registering the section information in the user authentication information is necessary. In general, an administrator carries out such operation. If a user performs such operation by himself/herself, he/she needs to perform such operation on a registration screen. Unfortunately, it is burdensome for the administrator or the user to perform the operation for registering the section information in the user authentication information.

To cope with this, a cooperative function is provided. According to this function, a user is associated (correlated) with a division in advance. Then, if the user is successfully authenticated by user authentication, then he/she is permitted to log onto an image forming apparatus through the division correlated with him/her. In the case of using the cooperative function, it is unnecessary for the administrator to operate user authentication information for individual users, and it is possible for the user to log onto the image forming apparatus through the division merely by user authentication.

There is proposed a method used in an image forming apparatus configured to register therein divisions to which individual users belong, and to perform user authentication in conjunction with section authentication. According to the method, if a user whose division is not registered in the image forming apparatus attempts to log thereonto, and is successfully authenticated by user authentication, then his/her division is registered into the image forming apparatus (cooperative registration), and thereafter the image forming apparatus performs section authentication on the user merely by user authentication.

Further, another method is proposed in Japanese Laid-open Patent Publication No. 2003-195704. According to the method, individual-specific data, for specifying a user, created by reading a fingerprint or the like is registered in a memory in association with a section number. Upon the use of an image forming apparatus, a comparison is made between the individual-specific data registered in advance and individual-specific data created by reading a fingerprint or the like of a user. In the case where it is determined that the created individual-specific data has been already registered, the image forming apparatus is allowed to be used according to the section number registered in association with the individual-specific data.

In general, however, each user is associated with only one division. Further, in the image forming apparatus having the cooperative function, whether or not the cooperative function is made available is set on the entirety of the image forming apparatus. Accordingly, if at least one of all the users registered in the image forming apparatus is associated with a plurality of divisions, it is necessary to make a setting such that the cooperative function is disabled therein. This makes it impossible for a user who is inherently supposed to use the cooperative function, i.e., such as a user associated with only one division to use the cooperative function, which may cause inconvenience to the user.

SUMMARY

The present disclosure is directed to solve the problems pointed out above, and therefore, an object of an embodiment of the present invention is to facilitate, in an image forming apparatus performing user authentication and section authentication in combination, operation for logging thereonto performed by individual users without increasing tasks imposed on an administrator or the users even if the number of sections (divisions) associated with the users differs according to the users.

According to an aspect of the present invention, an image forming apparatus which performs an image-related process includes a first authentication portion that performs a first authentication process on a user who is to log onto the image forming apparatus, a second authentication portion that performs a second authentication process on the user successfully authenticated by the first authentication portion, and thereby determines whether or not the user is permitted to log onto the image forming apparatus, a first authentication information storage portion that stores therein first authentication information used for the first authentication process performed by the first authentication portion, a second authentication information storage portion that stores therein second authentication information used for the second authentication process performed by the second authentication portion, an associated information storage portion that stores therein associated information for associating the first authentication information with the second authentication information, and a cooperative setting portion that performs setting therethrough, on a user-by-user basis, whether or not the first authentication process and the second authentication process are performed in combination with each other. If the user for whom setting is performed such that the first authentication process and the second authentication process are performed in combination with each other is successfully authenticated by the first authentication portion, then the second authentication portion determines that said user is to be permitted to log onto the image forming apparatus based on the associated information and ends the second authentication process. If the user for whom setting is performed such that the first authentication process and the second authentication process are not performed in combination with each other is successfully authenticated by the first authentication portion, then the second authentication portion performs the second authentication process on said user not based on the associated information.

Preferably, the cooperative setting portion is configured to allow each user to perform the setting therethrough, and the image forming apparatus further includes a user-specific correlation setting portion by means of which an administrator performs setting, on a user-by-user basis, whether or not the setting performed by the user through the cooperative setting portion is permitted.

These and other characteristics and objects of the present invention will become more apparent by the following descriptions of preferred embodiments with reference to drawings.

BRIEF DESCRIPTION OF THE DRAWINGS

FIG. 4 is a diagram illustrating an example of a user information table.

FIG. 5 is a diagram illustrating an example of a section information table.

FIG. 6 is a diagram illustrating an example of a cooperative registration option setting screen.

FIG. 7 is a diagram illustrating an example of transition from a user authentication screen to a cooperative registration setting screen.

FIG. 9 is a diagram illustrating an example of a correlated information table.

FIG. 11 is a diagram illustrating an example of a history display screen.

FIG. 12 is a diagram illustrating an example of a permission or lack thereof determination screen.

DESCRIPTION OF THE PREFERRED EMBODIMENTS

Figure 1:
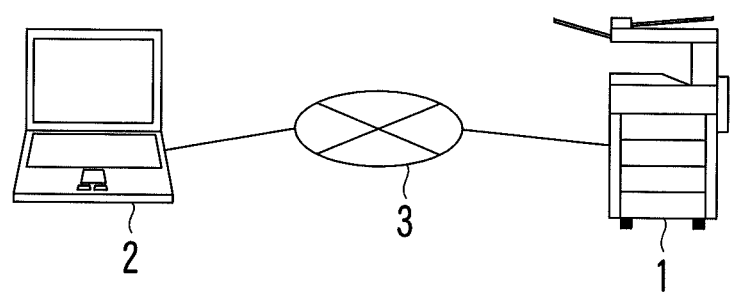
FIG. 1 is a diagram illustrating an example of a network system including an image forming apparatus according to an embodiment of the present invention.

A network system NS illustrated in FIG. 1 is a network system including an image forming apparatus 1 according to an embodiment of the present invention.

Referring to FIG. 1, the network system NS is configured of the image forming apparatus 1, a terminal 2, a communication line 3, and the like. A LAN, the Internet, a public line, a dedicated line, or the like is used as the communication line 3. File Transfer Protocol (FTP), Post Office Protocol (POP), Simple Mail Transfer Protocol (SMTP), or the like is used as a communication protocol.

The network system NS is established in offices of business, public organizations, or facilities such as schools. The following is a description of an example in which the network system NS is used in an A-company having a plurality of sections (divisions).

The image forming apparatus 1 is configured to integrate, thereinto, a variety of functions, such as copying, network printing, faxing, scanning, and a document server.

Other than those described above, the image forming apparatus 1 of this embodiment has a user authentication function, a section authentication function, and a section management function. The user authentication function is to identify a user who attempts to log onto the image forming apparatus 1. The section authentication function is to determine whether or not a user who specifies a section or a group and attempts to log onto the image forming apparatus 1 is authorized to use the image forming apparatus 1 in the specified section. Stated differently, the section authentication function is to determine whether or not a user is permitted to log onto the image forming apparatus 1 through the specified section. The section management function is to manage, on a section-by-section basis, information on the amount charged for the use of the functions provided in the image forming apparatus.

Figure 2:
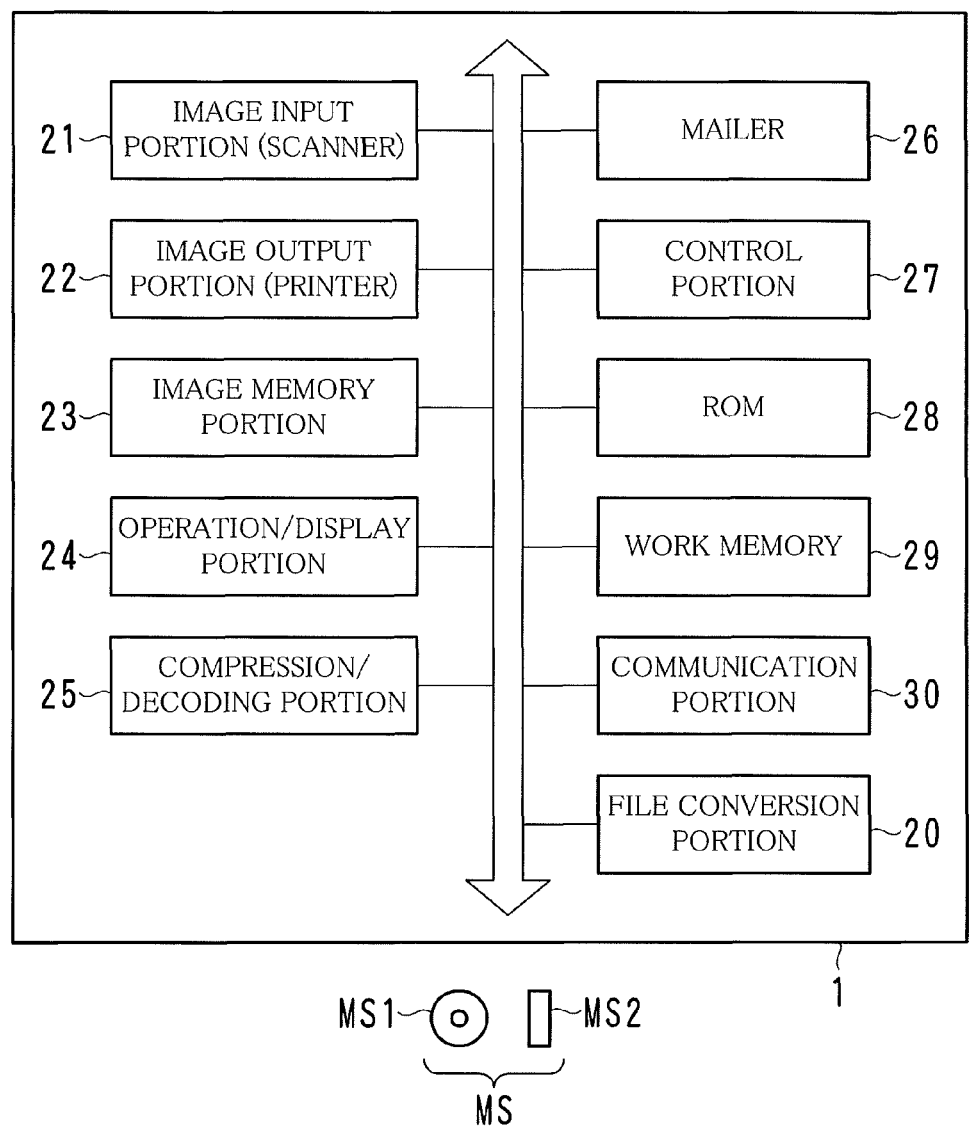
FIG. 2 is a diagram illustrating an example of the hardware configuration of an image forming apparatus according to an embodiment.

Referring to FIG. 2, the image forming apparatus 1 is configured of an image input portion (scanner) 21 for optically reading images printed on paper to convert the images into electronic data (image data), an image output portion (printer) 22 for printing, onto paper, an image based on the image data, an image memory portion 23 for temporarily storing image data that is inputted from the image input portion 21 or obtained externally via a communication portion 30, an operation/display portion (operational panel) 24 by means of which various input operation is performed and which displays various setting information on operation, a compression/decoding portion 25 for compressing and decoding image data, a mailer (electronic mail transmission and reception application) 26 for sending/receiving electronic mail messages, a control portion 27 for performing control operation by a software process in accordance with a control program (computer program) stored in advance in a ROM 28 based on an operation signal outputted depending on operation performed by the user through the operation/display portion 24, the ROM 28, a work memory (RAM) 29, the communication portion 30 for communicating with external equipment via the LAN or a telephone line, a file conversion portion 20 for performing file format conversion of a variety of file formats, e.g., an image data file format and an electronic mail file format. The image forming apparatus 1 is configured of a part or the whole of these portions. Note that, in reality, a volatile or non-volatile memory functions as both the image memory portion 23 and the work memory 29. Steps for executing the computer program in the image forming apparatus 1 are discussed later.

The image input portion 21 is configured of an image sensor such as a Charge Coupled Device (CCD), a slider control, a variety of image processing controls, and the like. The image input portion 21 serves to optically read images printed on paper to convert the images into electric signals.

The image output portion 22 is configured of an engine control for a laser or an inkjet, a variety of image processing controls, and the like. The image output portion 22 serves to output electric signals onto paper.

The image memory portion 23 stores, therein, image data inputted by the image input portion 21 and image data externally obtained via the communication portion 30. The image memory portion 23 also stores, therein, coded data obtained as a result of compression of image data by the compression/decoding portion 25.

The operation/display portion 24 is a user interface configured of a numerical keypad, a start key, a Liquid Crystal Display (LCD), and the like. A user performs operation for selecting a mode or simple keystroke operation through the operation/display portion 24.

The compression/decoding portion 25 performs a process for compressing inputted image data if necessary, or a process for expanding coded data.

The control portion 27 is configured of a CPU for controlling the entirety of the individual portions of the image forming apparatus 1 and a peripheral circuit. The control portion 27 is connected to the individual portions via a system bus. The control portion 27 is also connected to the ROM for storing therein control programs and control data, and the RAM for temporarily storing therein control variables.

The communication portion 30 performs communication using a telephone line via a modem or an NCU. The communication portion 30 is connected to a network via a LAN control portion (not shown); thereby to send and receive image information to and from another communication device.

Figure 3:
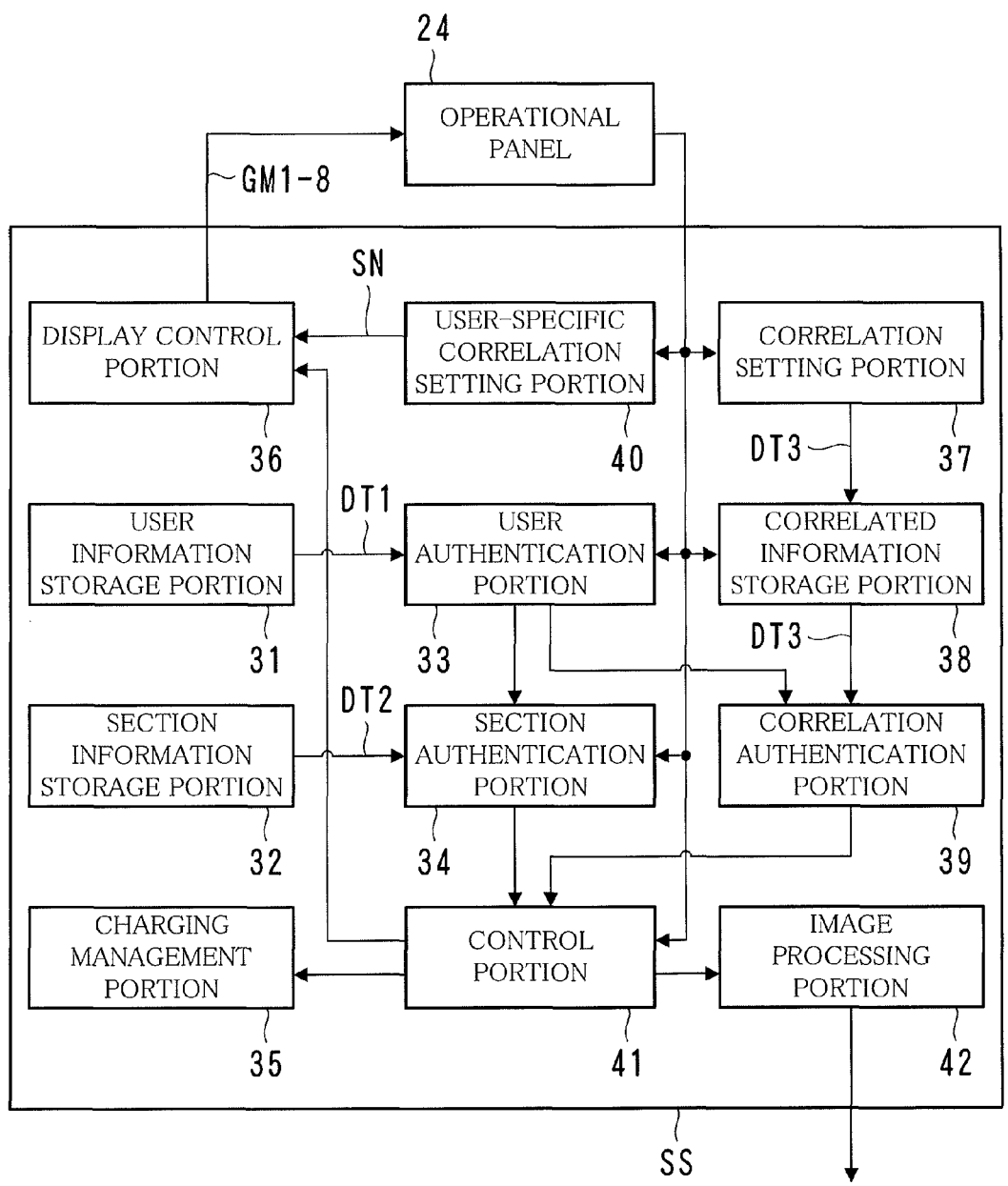
FIG. 3 is a diagram illustrating an example of the functional configuration of an authentication process control portion of an image forming apparatus according to an embodiment.

FIG. 3 illustrates an example of the functional configuration of an authentication process control portion SS of the image forming apparatus 1.

Referring to FIG. 3, the authentication process control portion SS includes a user information storage portion 31, a section information storage portion 32, a user authentication portion 33, a section authentication portion 34, a charging management portion 35, a display control portion 36, a correlation setting portion 37, a correlated information storage portion 38, a correlation authentication portion 39, a user-specific correlation setting portion 40, a control portion 41, and an image processing portion 42.

In this embodiment, the CPU of the control portion 27 executes the computer program; thereby to implement the authentication process control portion SS. The computer program for implementing the functions or the processes of the authentication process control portion SS may be recorded onto a portable recording medium MS (see FIG. 2), e.g., a recording medium MS1 such as a CD-ROM or a DVD-ROM, or a semiconductor memory MS2, and installed therefrom. Alternatively, the computer program may be downloaded from a server via the network. The computer program for implementing the functions described above and data are installed into the hard disk, loaded into the RAM as necessary, whereupon the program is executed by the CPU. Note that the CPU is configured to act as a computer, and may be connected to an external computer via the LAN or the like. Further, a configuration is possible in which a part or the whole of the functions of the image forming apparatus 1 is implemented by a digital processor or a hardware circuit.

Figure 8:
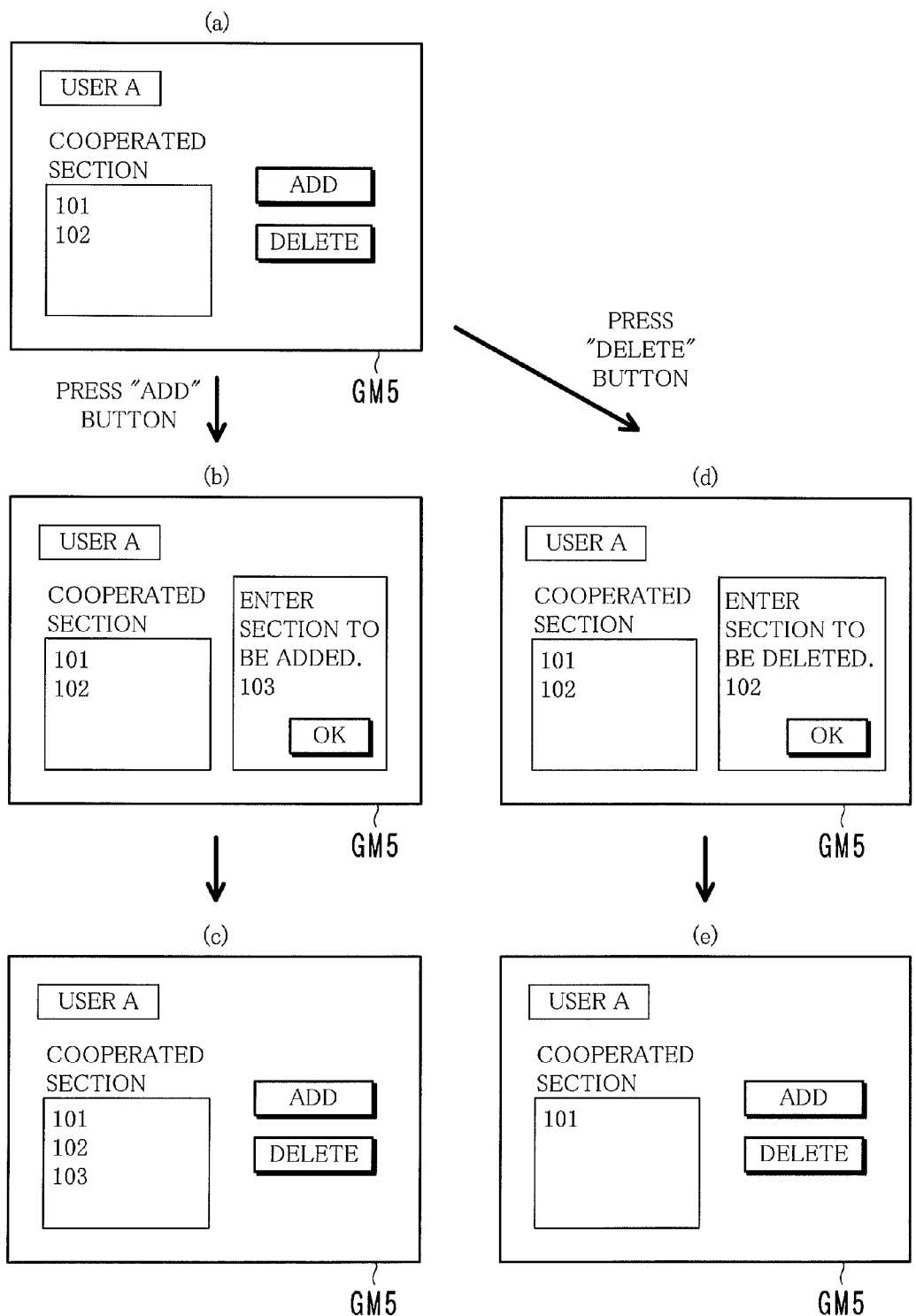
FIG. 8 is a diagram illustrating an example of a correlated section editing screen.
Figure 10A:
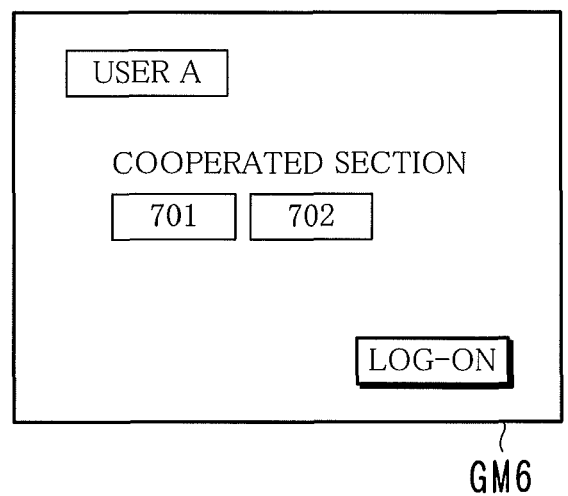
FIGS. 10A and 10B are diagrams illustrating an example of a section selection screen.
Figure 10B:
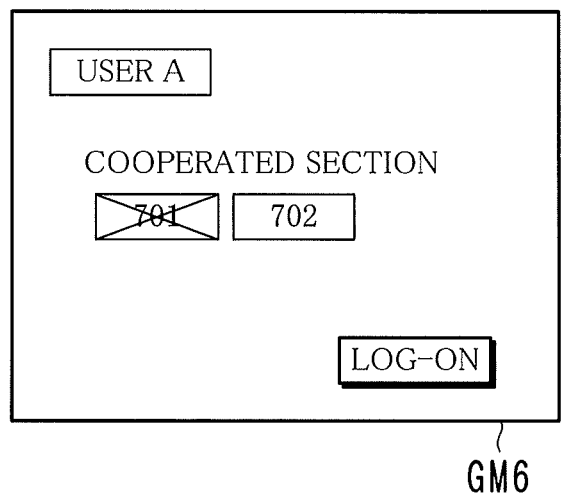

FIG. 4 is a diagram illustrating an example of a user information table TB1; FIG. 5 is a diagram illustrating an example of a section information table TB2; FIG. 6 is a diagram illustrating an example of a cooperative registration option setting screen GM1; FIG. 7 is a diagram illustrating an example of transition from a user authentication screen GM2 to a cooperative registration setting screen GM4; FIG. 8 is a diagram illustrating an example of a correlated section editing screen GM5; FIG. 9 is a diagram illustrating an example of a correlated information table TB3; FIGS. 10A and 10B are diagrams illustrating an example of a section selection screen GM6; FIG. 11 is a diagram illustrating an example of a history display screen GM7; and FIG. 12 is a diagram illustrating an example of a permission or lack thereof determination screen GM8.

The following is a description of the functions and the details of processes performed by the individual portions of the image forming apparatus 1 illustrated in FIG. 3.

The user information storage portion 31 stores, therein, the user information table TB1 and manages the same. Referring to FIG. 4, the user information table TB1 saves (stores), therein, user account information DT1 for a user of the image forming apparatus 1. One user is given one piece of user account information DT1. The user account information DT1 indicates a user ID and a password of a user given the subject user account information DT1.

The section information storage portion 32 stores, therein, the section information table TB2 and manages the same. Referring to FIG. 5, the section information table TB2 saves (stores), therein, section information DT2 for a section of the A-company. One section is given one piece of section information DT2. The section information DT2 indicates a section number and a password of a section necessary for a user to log onto the image forming apparatus 1 through the subject section.

The user authentication portion 33 performs a process for verifying the identity of a user who attempts to log onto the image forming apparatus 1, i.e., a user authentication process. The user authentication process is performed in the following manner.

In the case where a user enters a user ID and a password on the user authentication screen GM2 (see FIG. 7), the user authentication portion 33 searches for user account information DT1 having the user ID in the user information table TB1 (see FIG. 4) stored in the user information storage portion 31. If the user account information DT1 is found by the search, then the user authentication portion 33 compares the password entered by the user with a password indicated in the user account information DT1 found. If there is a match therebetween, the user authentication portion 33 determines that the user is an authentic user. Hereinafter, a user whose identity is verified by a user authentication process is sometimes referred to as a "verified user".

The section authentication portion 34 performs a process for verifying whether or not the verified user is permitted to use the image forming apparatus 1 in a specified section, i.e., a section authentication process. The section authentication process is performed in the following manner.

The user of the image forming apparatus 1 selects, in advance, a section that is to be charged for the use of a function of the image forming apparatus 1, i.e., a charging target. Then, the user enters a section number and a password of a section as the charging target on a section authentication screen GM3 (see FIG. 7); thereby to specify the section. If the section number and the password are entered on the section authentication screen GM3 to specify the section, then the section authentication portion 34 searches for section information DT2 having the section number in the section information table TB2 (see FIG. 5) stored in the section information storage portion 32. If the section information DT2 is found by the search, then the section authentication portion 34 compares the password entered by the verified user with a password indicated in the section information DT2 found. If there is a match therebetween, the section authentication portion 34 permits the verified user to log onto the image forming apparatus 1 through the section corresponding to the section number.

The charging management portion 35 performs a process for managing, for each section, charging information on the use of the functions provided in the image forming apparatus 1, i.e., a process for charging management. In the case where the section authentication portion 34 permits the verified user to log onto the image forming apparatus 1, the charging management portion 35 stores and manages, in a charging memory (not shown), the amount charged for functions that the verified user has used until he/she logs out of the image forming apparatus 1 with the section specified by the verified user set as a charging target.

The display control portion 36 performs a process for displaying a predetermined screen on the operational panel at a predetermined timing. For example, the display control portion 36 displays, on the operational panel, the user authentication screen GM2 while no one logs onto the image forming apparatus 1.

The correlation setting portion 37 performs a process for associating (correlating) a user of the image forming apparatus 1 with individual sections, i.e., a correlating process. The correlation setting portion 37 performs the correlating process in cooperation with, for example, the display control portion 36. The correlating process is performed in the following manner.

The user of the image forming apparatus 1 can determine, in advance, on the cooperative registration option setting screen GM1 as illustrated in FIG. 6, whether or not a cooperative registration setting is made available. The cooperative registration setting is to permit the user to log onto the image forming apparatus 1 through a section correlated with the user merely by authentication based on the user authentication process. If the user intends to make the cooperative registration setting available, then he/she presses "YES" button. If the user intends to make the cooperative registration setting unavailable, then he/she presses "NO" button.

Individual users thus can select whether or not to perform a user authentication process (a first authentication process) in conjunction with either section authentication process or correlation authentication process (a second authentication process). Another configuration is possible in which only an administrator can set whether the cooperative registration setting is made available or unavailable for the individual users.

Upon a user authentication process, the display control portion 36 displays the user authentication screen GM2 illustrated in FIG. 7. When a user is successfully authenticated by the user authentication process, the display control portion 36 changes the indication to the section authentication screen GM3. If the cooperative registration setting has been made available and the user is successfully authenticated by a section authentication process, then the display control portion 36 changes the indication to the cooperative registration setting screen GM4. The user selects, on the cooperative registration setting screen GM4, whether or not to perform a cooperative registration process (a correlating process) for the specified section. If the user intends to perform the cooperative registration, then he/she presses "YES" button displayed on the cooperative registration setting screen GM4. If the user does not intend to perform the cooperative registration, then he/she presses "NO" button thereon.

In the case where the user presses the "YES" button on the cooperative registration setting screen GM4, the correlation setting portion 37 correlates the user ID of the user with a section number of the section specified by the user, generates correlated information DT3 (described later), and registers (saves) the correlated information DT3 in the correlated information storage portion 38. In this way, the correlating process is completed.

In the case where a setting has been made to disable the cooperative registration setting, the cooperative registration setting screen GM4 is not displayed, and the correlating process is not performed. Further, in the case where the user presses the "NO" button on the cooperative registration setting screen GM4, the correlating process is not performed either.

The verified user also can edit a section that has been subjected to the correlating process. For example, the user can edit to add or delete a section that has been subjected to the correlating process on the correlated section editing screen GM5 illustrated in FIG. 8. The user edits to add a section in the following manner.

The user presses "ADD" button on the correlated section editing screen GM5 (see (a) of FIG. 8), enters a section number of a section to be added, and presses "OK" button (see (b) of FIG. 8). Responding to this, the indication is changed to the section authentication screen GM3 once, and the section authentication portion 34 performs a section authentication process. At this time, the user enters a section number of a section to be added and a password thereof. If the section number and the password entered are successfully authenticated by the section authentication portion 34, then he/she is allowed to add the section (see (c) of FIG. 8). If the authentication by the section authentication process is unsuccessful, then the user is not allowed to add the section corresponding to the section number entered. In the case where editing is performed to add or delete a section that has been subjected to the correlating process, the details of the editing are reflected in the correlated information DT3 of the individual users. In other words, editing to add or delete a section that has been subjected to the correlating process results in editing of the correlated information DT3.

The correlating process is performed during the authentication process in the example discussed above. Instead, however, the correlating process may be performed on another setting screen.

Referring back to FIG. 3, the correlated information storage portion 38 stores therein the correlated information table TB3 that, as illustrated in FIG. 9, saves (stores) therein the correlated information DT3 generated by the correlation setting portion 37. The correlated information DT3 indicates one or more section numbers in association with one user ID.

Stated differently, the correlated information DT3 associates a user ID that is a part of the user account information DT1 with a section number that is a part of the section information DT2. Thereby, the user account information DT1 is associated with the section information DT2.

The correlation authentication portion 39 performs, based on the correlated information table TB3 stored in the correlated information storage portion 38, a process for permitting a verified user to log onto the image forming apparatus 1 through a section correlated with the verified user, i.e., a correlation authentication process. The correlation authentication process is performed in the following manner.

In the case where a user is successfully authenticated by a user authentication process, the correlation authentication portion 39 determines whether or not a section is correlated with the successfully-authenticated user (the verified user) based on the user ID of the verified user and the correlated information table TB3 stored in the correlated information storage portion 38. To be specific, the correlation authentication portion 39 searches for correlated information DT3 having the user ID of the verified user in the correlated information table TB3 (see FIG. 9). If such correlated information DT3 is found by the search, or, in other words, the correlation authentication portion 39 determines that a section is correlated with the verified user, then the correlation authentication portion 39 permits the verified user to log onto the image forming apparatus 1 through the section corresponding to the section number indicated in the correlated information DT3.

In such a case, the verified user is not required to enter a password for section authentication which is managed in the section information table TB2.

If a plurality of section numbers are associated with the user ID indicated in the correlated information DT3 found by the search, then the section selection screen GM6 (see FIG. 10A) is displayed to prompt the user corresponding to the user ID to select a section through which he/she attempts to logs onto the image forming apparatus 1. The user selects, on the section selection screen GM6, a section through which he/she attempts to logs onto the image forming apparatus 1. In the case where the user has edited to delete a section on the correlated section editing screen GM5 (see FIG. 8), the section selection screen GM6 (see FIG. 10B) is displayed which enables the user to check the deleted section. Another configuration is possible in which, when a plurality of sections are associated with a user, the user sets, in advance, a section through which he/she intends to log onto the image forming apparatus 1.

If the correlated information DT3 having the user ID of the verified user is not found by the search, i.e., if the verified user has not performed a cooperative registration setting, or if the verified user has disabled a cooperative registration setting, then the section authentication portion 34 performs a section authentication process. In the case where, the user has ever logged onto the image forming apparatus 1 through any section, the history display screen GM7 illustrated in FIG. 11 is displayed instead of the section authentication screen GM3 (see FIG. 7), and the section authentication process is performed. As illustrated in FIG. 11, section numbers of sections through which the user has ever logged onto the image forming apparatus 1 are displayed on the history display screen GM7 as a history of the sections. The user may select, on the history display screen GM7, a section through which the user intends to log onto the image forming apparatus 1 with reference to the section numbers of the sections through which the user has ever logged thereonto. Further, the upper limit may be set, in advance, on an amount of section numbers displayed on the history display screen GM7. In such a case, the section numbers are supposed to be displayed within the set upper limit. As for a user who has never logged onto the image forming apparatus 1, the section authentication screen GM3 rather than the history display screen GM7 is displayed.

As discussed above, in the case where the cooperative registration has been set to be available, a correlation authentication process is automatically performed on the verified user based on the correlated information DT3, and it is determined that the verified user is a user to whom logging onto the image forming apparatus 1 is to be permitted. The correlation authentication process is an alternative to the section authentication process, and may be regarded as a part of the section authentication process in a broad sense. In contrast, in the case where the cooperative registration has been set to be unavailable, the section authentication process is performed on the verified user.

To be specific, in the case where the cooperative registration has been set to be available, the correlation authentication portion 39 performs a correlation authentication process, instead of a section authentication process by the section authentication portion 34. Thereby, it is determined whether or not a verified user is a user to whom logging onto the image forming apparatus 1 is to be permitted. In contrast, in the case where the cooperative registration has been set to be unavailable, the section authentication portion 34 performs a section authentication process. Thereby, it is determined whether or not a verified user is a user to whom logging onto the image forming apparatus 1 is to be permitted. With the section authentication process, the verified user is required to enter a password for section authentication. It is a matter of course that, during the section authentication process, a process based on the correlated information DT3 is not performed.

In this embodiment, thus, either the section authentication process or the correlation authentication process is performed as a "second authentication process" according to the present invention.

The above-described sequence of processes by the correlation authentication portion 39 is performed in cooperation with the section authentication portion 34. Instead, however, either the section authentication portion 34 or the correlation authentication portion 39 may perform the sequence of processes separately from each other.

The user-specific correlation setting portion 40 performs a process for causing an administrator to determine whether or not to permit individual users to perform a cooperative registration setting, i.e., a permission or lack thereof setting process. The user-specific correlation setting portion 40 performs the permission or lack thereof setting process in cooperation with, for example, the display control portion 36. The permission or lack thereof setting process is performed in the following manner.

The administrator determines, on the permission or lack thereof determination screen GM8 illustrated in FIG. 12, whether or not to permit the individual users to perform cooperative registration. If the administrator determines that a permission of the cooperative registration is given to a user, then he/she presses the indication of "permitted" corresponding to a user ID of the user (see FIG. 12). If the administrator determines that a user is prohibited from performing the cooperative registration, then he/she presses the indication of "prohibited" corresponding to a user ID of the user (also see FIG. 12). Thus, whether or not the individual users are permitted to perform the cooperative registration is set on a user-by-user basis. Note that the permission or lack thereof determination screen GM8 is displayed only when an authorized user such as an administrator logs onto the image forming apparatus 1.

The user-specific correlation setting portion 40 registers, in the hard disk, user information of a user to whom the cooperative registration is permitted. The user-specific correlation setting portion 40, then, sends a permission signal SN to the display control portion 36 in such a manner that the cooperative registration setting screen GM4 is displayed only when such a user is successfully authenticated by the section authentication process. This makes it possible that only a user who is permitted to perform the cooperative registration by the administrator performs the cooperative registration on the cooperative registration setting screen GM4.

The control portion 41 controls the charging management portion 35, the image processing portion 42, and the entirety of the image forming apparatus 1.

The image processing portion 42 performs a variety of image processing on image data read by the image input portion 21, image data transmitted from another device, or the like depending on a control signal outputted from the control portion 41.

Figure 13:
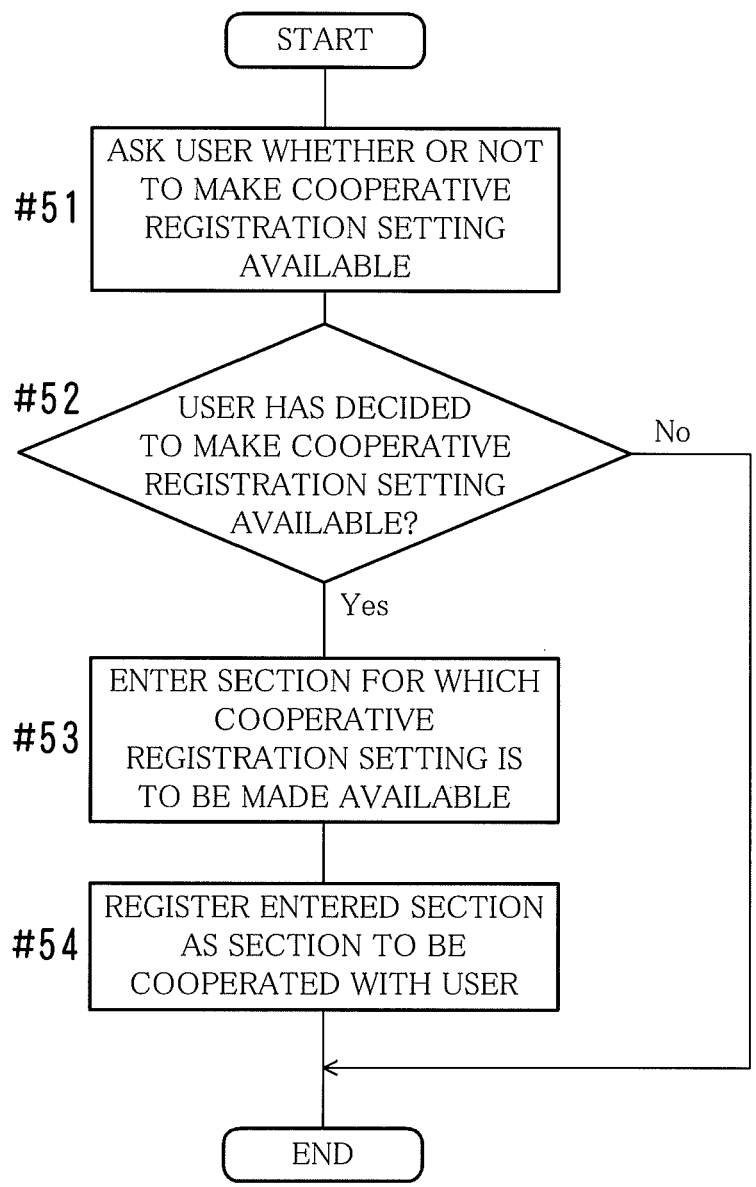
FIG. 13 is a flowchart illustrating an example of the overall processing flow of an image forming apparatus for a case where a correlating process is performed.
Figure 14:
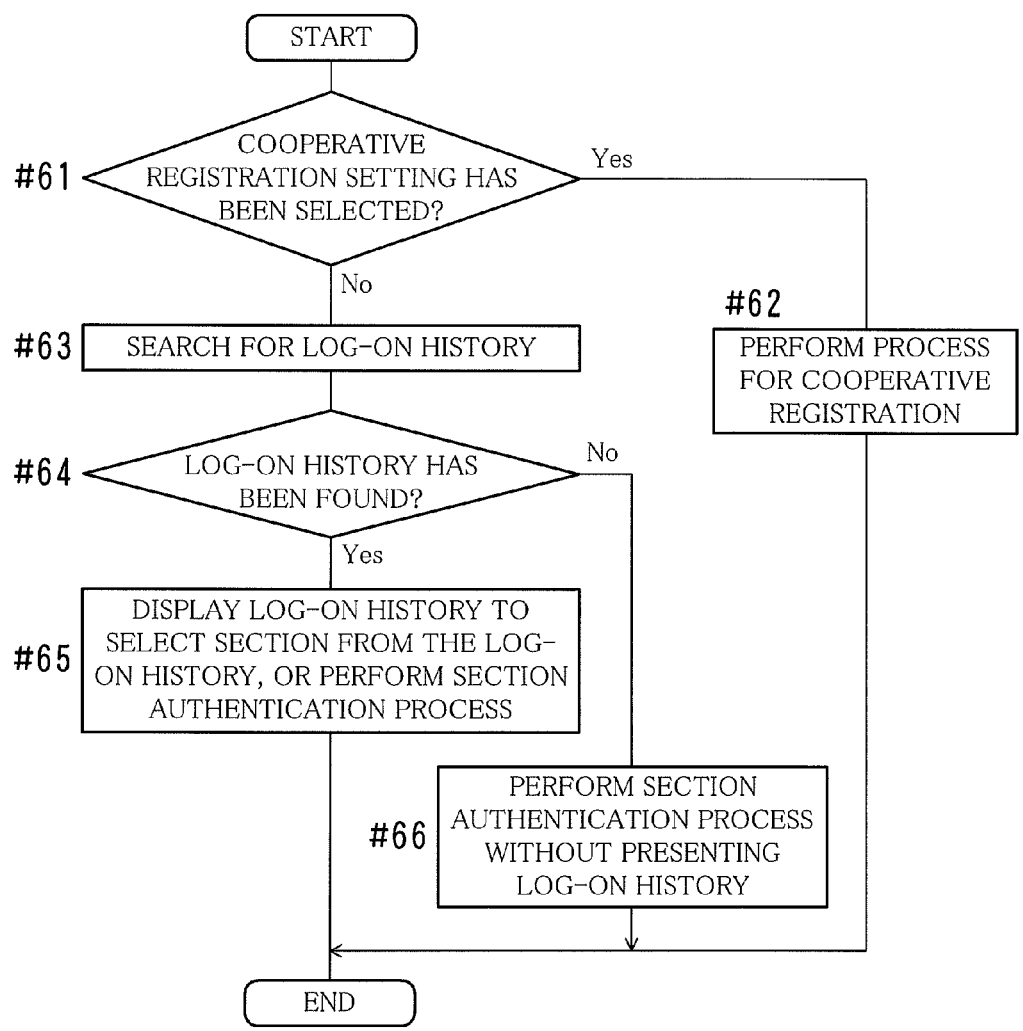
FIG. 14 is a flowchart illustrating an example of the overall processing flow of an image forming apparatus for a case where a section authentication process is performed.

FIG. 13 is a flowchart illustrating an example of the overall processing flow of the image forming apparatus 1 for a case where a correlating process is performed; and FIG. 14 is a flowchart illustrating an example of the overall processing flow of the image forming apparatus 1 for a case where a section authentication process is performed.

The following is a description, with reference to the flowchart of FIG. 13, of the overall processing flow of the image forming apparatus 1 for a case where a correlating process is performed, taking an example in which a user has not performed a setting as to whether or not the cooperative registration setting is made available.

In the case where the user is successfully authenticated by a user authentication process, the image forming apparatus 1 displays the cooperative registration option setting screen GM1 (see FIG. 6), and prompts the user, who has been successfully authenticated by the user authentication process, i.e., the verified user, to select whether or not to make the cooperative registration setting available (#51). If the verified user performs a setting for making the cooperative registration setting available (Yes in #52), then the image forming apparatus 1 displays the section authentication screen GM3 (see FIG. 7) to prompt the verified user to enter a section number of a section for which the cooperative registration setting is to be made available (#53), and performs a section authentication process. If the verified user is successfully authenticated by the section authentication process, and presses the "YES" button on the cooperative registration setting screen GM4, the image forming apparatus 1 performs a correlating process on the section corresponding to the section number entered by the verified user (#54). If a setting has been performed by the administrator such that the cooperative registration setting is made unavailable, then the image forming apparatus 1 does not perform the correlating process for the verified user. If a setting has been performed by the administrator such that the cooperative registration setting is prohibited, then the image forming apparatus 1 does not perform the correlating process for the verified user either.

The following is a description, with reference to the flowchart of FIG. 14, of the overall processing flow of the image forming apparatus 1 for a case where a section authentication process is performed, taking an example in which a user has performed a setting as to whether or not cooperative registration setting is made available.

In the case where the user is successfully authenticated by the user authentication process, the image forming apparatus 1 determines whether the successfully-authenticated user, i.e., the verified user, has made the cooperative registration setting available or unavailable. If a setting has been performed such that the cooperative registration setting is made available (Yes in #61), then the image forming apparatus 1 performs a process for permitting the verified user to log onto the image forming apparatus 1 through a section correlated with the verified user (#62). If a setting has been performed such that the cooperative registration setting is made unavailable (No in #61), then the image forming apparatus 1 searches for a log-on history of the verified user (#63). If it is found, by the search, that the verified user has ever logged onto the image forming apparatus 1 through a section (Yes in #64), then the image forming apparatus 1 displays the history display screen GM7 (see FIG. 11) and performs a section authentication process (#65). In this instance, in the case where the upper limit is set on the amount of section numbers to be displayed on the history display screen GM7, the image forming apparatus 1 displays the section numbers not to exceed the set upper limit. If it is found, by the search, that the verified user has never logged onto the image forming apparatus 1 through any of the sections (No in #64), then the image forming apparatus 1 displays the section authentication screen GM3 and performs a section authentication process (#66).

The embodiments discussed above enable individual users to optionally set whether or not to make the cooperative registration setting available. Thus, the embodiments make it possible to facilitate logging-on operation to the image forming apparatus 1 without increasing tasks imposed on an administrator or the users, even if the number of sections associated with the users differs from one another.

In the embodiments described above, the user authentication process corresponds to a "first authentication process" according to the present invention, and the user authentication portion 33 corresponds to a "first authentication portion" of the present invention. Each of the section authentication process and the correlation authentication process corresponds to a "second authentication process" of the present invention. Each of the section authentication portion 34 and the correlation authentication portion 39 corresponds to a "second authentication portion" of the present invention. The user account information DT1, the section information DT2, the correlated information DT3, and the correlated information storage portion 38, respectively, correspond to "first authentication information", "second authentication information", "associated information", and an "associated information storage portion" of the present invention. The display control portion 36 corresponds to a "cooperative setting portion" and an "information presenting portion".

Further, a section number of a section through which a user has ever logged onto the image forming apparatus 1 corresponds to a "history of a section" according to the present invention.

In the embodiment discussed above, the overall configurations and functions of the network system NS and the image forming apparatus 1, the configurations and functions of various portions thereof, the details of the data, the details of the table, the content to be processed, the processing order, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image forming apparatus for performing an image-related process, the image forming apparatus comprising:
   a first authentication portion that performs user authentication as a first authentication process on a user who is to log onto the image forming apparatus;
   a second authentication portion that performs a second authentication process, other than said user authentication, on the user successfully authenticated by the first authentication portion, and thereby determines whether or not the user is permitted to log onto the image forming apparatus;
   a first authentication information storage portion that stores therein first authentication information of user authentication used for the first authentication process performed by the first authentication portion;
   a second authentication information storage portion that stores therein second authentication information used for the second authentication process performed by the second authentication portion;
   a correlated information storage portion that stores therein correlated information for correlating the first authentication information with the second authentication information; and
   a cooperative setting portion that performs setting therethrough, on a user-by-user basis, whether or not the first authentication process and the second authentication process are performed in combination with each other,
   wherein, if the user for whom setting is performed such that the first authentication process and the second authentication process are performed in combination with each other is successfully authenticated by the first authentication portion, then the second authentication portion determines that said user is to be permitted to log onto the image forming apparatus based on said correlated information and does not perform the second authentication process, and, if the user for whom setting is performed such that the first authentication process and the second authentication process are not performed in combination with each other is successfully authenticated by the first authentication portion, then the second authentication portion performs the second authentication process on said user not based on said correlated information.

2. The image forming apparatus according to claim 1, wherein
the cooperative setting portion is configured to allow each user to perform the setting therethrough, and
the image forming apparatus further comprises a user-specific correlation setting portion by means of which an administrator performs setting, on a user-by-user basis, whether or not the setting performed by the user through the cooperative setting portion is permitted.

3. The image forming apparatus according to claim 1, wherein
the first authentication information is information based on which the user who is to log onto the image forming apparatus is identified, and
the second authentication information is information based on which the user is to log onto the image forming apparatus through one section that is to be charged for a use of the image forming apparatus.

4. The image forming apparatus according to claim 3, wherein
the correlated information is to correlate one piece of the first authentication information with the second authentication information on said one section or more, and
if the user for whom setting is performed such that the first authentication process and the second authentication process are performed in combination with each other is successfully authenticated by the first authentication portion, then the second authentication portion determines that said user is to be permitted to log onto the image forming apparatus through the section specified by said user among said one section or more included in the correlated information.

5. The image forming apparatus according to claim 1, wherein the correlated information is editable by the user successfully authenticated by the first authentication portion.

6. The image forming apparatus according to claim 5, further comprising an information presenting portion that presents, to the user successfully authenticated by the first authentication portion, the section corresponding to the second authentication information deleted by editing by said user.

7. The image forming apparatus according to claim 6, wherein, when the second authentication process is performed on the user for whom setting is performed such that the first authentication process and the second authentication process are not performed in combination with each other, the information presenting portion presents, to said user, a log-on history of the section that is to be charged for a use of the image forming apparatus.

8. The image forming apparatus according to claim 6, wherein the information presenting portion is configured to set an upper limit of an amount of the section included in the log-on history to be presented to the user successfully authenticated by the first authentication portion.

9. The image forming apparatus according to claim 1, wherein the cooperative setting portion is configured to allow only an administrator to perform the setting therethrough.

10. A non-transitory computer-readable storage medium storing thereon a computer program used in a computer provided in an image forming apparatus for performing an image-related process, the computer program causing the image forming apparatus to implement:
a first authentication portion that performs user authentication as a first authentication process on a user who is to log onto the image forming apparatus;
a second authentication portion that performs a second authentication process, other than said user authentication, on the user successfully authenticated by the first authentication portion, and thereby determines whether or not the user is permitted to log onto the image forming apparatus;
a first authentication information storage portion that stores therein first authentication information of user authentication used for the first authentication process performed by the first authentication portion;
a second authentication information storage portion that stores therein second authentication information used for the second authentication process performed by the second authentication portion;
a correlated information storage portion that stores therein correlated information for correlating the first authentication information with the second authentication information; and
a cooperative setting portion that performs setting therethrough, on a user-by-user basis, whether or not the first authentication process and the second authentication process are performed in combination with each other,
wherein, if the user for whom setting is performed such that the first authentication process and the second authentication process are performed in combination with each other is successfully authenticated by the first authentication portion, then the image forming apparatus is caused to determine that the user is to be permitted to log onto the image forming apparatus based on said correlated information and the second authentication process is not performed by the second authentication portion, and, if the user for whom setting is performed such that the first authentication process and the second authentication process are not performed in combination with each other is successfully authenticated by the first authentication portion, then the image forming apparatus is caused to perform the second authentication process on said user not based on said correlated information.

11. The non-transitory computer-readable storage medium according to claim 10, wherein
the cooperative setting portion is implemented to allow each user to perform the setting therethrough, and
the computer program causes the image forming apparatus to further implement a user-specific correlation setting portion by means of which an administrator performs setting, on a user-by-user basis, whether or not the setting performed by the user through the cooperative setting portion is permitted.

12. The non-transitory computer-readable storage medium according to claim 10, wherein
the first authentication information is information based on which the user who is to log onto the image forming apparatus is identified, and the second authentication information is information based on which the user is to log onto the image forming apparatus through one section that is to be charged for a use of the image forming apparatus.

13. The non-transitory computer-readable storage medium according to claim 12, wherein the correlated information is to correlate one piece of the first authentication information with the second authentication information on said one section or more, and if the user for whom setting is performed such that the first authentication process and the second authentication process are performed in combination with each other is successfully authenticated by the first authentication portion, then the second authentication portion determines that said user is to be permitted to log onto the image forming apparatus through the section specified by said user among said one section or more included in the correlated information.

14. The non-transitory computer-readable storage medium according to claim 10, wherein the correlated information is editable by the user successfully authenticated by the first authentication portion.

15. The non-transitory computer-readable storage medium according to claim 14, wherein the computer program causes the image forming apparatus to further implement an information presenting portion that presents, to the user successfully authenticated by the first authentication portion, the section corresponding to the second authentication information deleted by editing by said user.

16. The non-transitory computer-readable storage medium according to claim 15, wherein, when the second authentication process is performed on the user for whom setting is performed such that the first authentication process and the second authentication process are not performed in combination with each other, the information presenting portion presents, to said user, a log-on history of the section that is to be charged for a use of the image forming apparatus.

17. The non-transitory computer-readable storage medium according to claim 15, wherein the information presenting portion is implemented to set an upper limit of an amount of the section included in the log-on history to be presented to the user successfully authenticated by the first authentication portion.

18. The non-transitory computer-readable storage medium according to claim 10, wherein the cooperative setting portion is implemented to allow only an administrator to perform the setting therethrough.

* * * * *